United States Patent Office 3,272,767
Patented Sept. 13, 1966

3,272,767
SYNTHETIC RUBBER LATEX PREPARED USING POLYOXYETHYLATED CASTOR OIL AND ANIONIC DISPERSING AGENTS
Louis H. Howland, Watertown, Victor S. Chambers, Naugatuck, and Robert MacFarlane, Jr., Hamden, Conn., assignors to United States Rubber Company, New York, N.Y., a corporation of New Jersey
No Drawing. Filed Apr. 6, 1962, Ser. No. 185,509
4 Claims. (Cl. 260—23.7)

This application is a continuation-in-part of copending application Serial No. 65,270, filed October 27, 1960, now abandoned.

This invention relates to the preparation of synthetic rubber latices of large particle size, particularly to permit them to be concentrated to fluid latices of high solids content.

We have found that polymerizing an aqueous emulsion of polymerizable synthetic rubber forming monomers containing the conventional 3 to 10 parts of anionic surface-active dispersing agent per 100 parts of said monomers in the presence of a small amount of polyoxyethylated castor oil will result in a latex having a much larger particle size than a similar latex without the polyoxyethylated castor oil. Such latices that have been polymerized in the presence of polyoxyethylated castor oil may readily be concentrated, preferably by evaporation concentration, to fluid high solids latices.

In carrying out the present invention, the emulsion of synthetic rubber forming monomers is polymerized to a latex of a solid content of 20% to 50%, generally a conversion of 50% to 95% monomers to polymer, in the presence of a small amount of polyoxyethylated castor oil. Polyoxyethylated castor oil is the condensation product of castor oil with ethylene oxide, and is a commercial non-ionic surface-active agent. The main constituent of castor oil (85% or more) is glyceryl triricinoleate, with the remainder essentially glyceryl trioleate and glyceryl trilinoleate. The ethylene oxide forms ether links with the hydroxyl groups in the 12-position in the ricinoleate radicals of the glyceryl triricinoleate. The commercial polyoxyethylated castor oil contains twenty to forty moles of ethylene oxide per mole of castor oil. The amount of polyoxyethylated castor oil may be from 0.004 to 2 parts, and preferably from 0.05 to 2 parts per 100 parts of the original rubber forming monomers. The polyoxyethylated castor oil is preferably included in the original charge as part of the polymerization recipe, or it may be added to the polymerization system up to 20% conversion of monomers. The temperature of polymerization is not critical and may be from 0° C. to 60° C. The time of polymerization is not critical, and will be that which will give the desired conversion of monomers to polymer. The polymerization recipe will contain the usual 3% to 10% of one or a mixture of anionic surface-active dispersing agents based on the weight of polymerizable monomers, which amount is sufficient to maintain the monomers emulsified and the synthetic rubber particles dispersed in the latex in the absence of the polyoxyethylated castor oil. The polymerization recipe may contain alkali salt electrolyte which itself is known to increase the particle size of the latex, and the inclusion of the polyoxyethylated castor oil in the polymerization recipe will still further increase the particle size of the latex. Such alkali salt electrolyte, which when used will generally be in amount from 0.2 to 2 parts per 100 parts of polymerizable rubber forming monomers, may be an alkali (potassium, sodium, ammonium or amine) salt of an acid such as carbonic, formic, acetic, sulfuric, hydrochloric, nitric or phosphoric acids. Examples of alkali salt electrolytes that may be used are ammonium carbonate, ammonium bicarbonate, methylamine carbonate, dimethyl amine carbonate, sodium formate, potassium acetate, sodium sulfate, potassium sulfate, sodium chloride, potassium chloride, sodium nitrate, trisodium phosphate. The latex will conventionally have a solids content of 20% to 50% and may be concentrated to a solids content of 55% to 70%, giving a fluid high solids latex. Unreacted monomers may be stripped from the latex before concentrating the latex. The latex may be concentrated by increasing the solids content in known manner as by creaming with a vegetable mucilage, such as ammonium alginate. It is preferred however, to increase the solids content by evaporation concentration.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3, with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex."

The polymerization recipe will contain the usual 3% to 10% of one or a mixture of anionic surface-active dispersing agents based on the weight of polymerizable monomers. Such anionic surface-active dispersing agents may be water-soluble soaps of soap-forming monocarboxylic acids, such as alkali-metal, ammonium or amine salts of higher fatty acids having 10 to 24 carbon atoms in the molecule or of rosin acids, including hydrogenated, dehydrogenated and disproportionated rosin acids. The anionic surface-active dispersing agents may be sulfonated or sulfated surface-active agents having the general formula $R—SO_3M$ or $R—OSO_3M$, respectively, where M represents alkali-metal, ammonium or amine radical, and R represents an organic radical containing a group having 9 to 23 carbon atoms. Examples of such sulfonated and sulfated surface active agents are:

(1) Alkyl sulfonates (e.g. dodecyl sodium sulfonate, cetyl potassium sulfonate).

(2) Alkyl sulfates (e.g. sodium dodecyl sulfate, sodium oleyl sulfate).

(3) Sulfonated ethers of long and short chain aliphatic groups (e.g. $C_{17}H_{33}—O—C_2H_4—SO_3—Na$).

(4) Sulfated ethers of long and short chain aliphatic groups (e.g. $C_{17}H_{33}—O—C_2H_4—O—SO_3Na$).

(5) Sulfonated alkyl esters of long chain fatty acids, e.g.

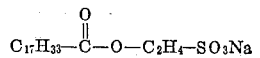

(6) Sulfonated glycol esters of long chain fatty acids, e.g.

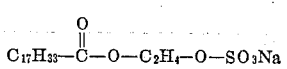

(7) Sulfonated alkyl substituted amides of long chain fatty acids, e.g.

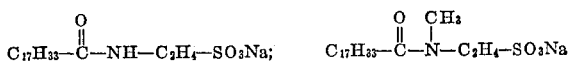

(8) Alkylated aryl sulfonates (e.g. isopropyl naphthalene sodium sulfonate; dodecyl benzene sodium sulfonate).

(9) Hydroaromatic sulfonates (e.g. tetrahydronaphthalene sodium sulfonate).

(10) Alkyl sulfosuccinates (e.g. dioctyl sodium sulfosuccinate).

(11) Aryl sulfonate-formaldehyde condensation products (e.g. condensation product of formaldehyde and sodium naphthalene sulfonate,

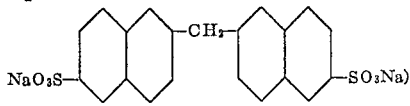

For optimum stability of the final latex, it is preferred that the 3 to 10 parts of anionic surface-active dispersing agent per 100 parts of polymerizable monomers comprise 0.2 to 1 part of such sulfonated or sulfated surface-active agents per 100 parts of polymerizable monomers, and the remainder of the 3 to 10 parts of surface-active dispersing agent per 100 parts of polymerizable monomers be such water soluble soaps. This is illustrated in the examples.

The following examples illustrate the invention. All parts and percentages referred to herein are by weight.

Example 1

In a control run A, a 24-ounce glass bottle reactor was loaded with the following ingredients:

| | Parts |
|---|---|
| Butadiene-1,3 | 51 |
| Styrene | 49 |
| Potassium oleate | 5.46 |
| Potassium soap of disproportionated rosin acids | 1.5 |
| Condensation product of sodium naphthalene sulfonate and formaldehyde | 0.43 |
| Potassium sulfate | 0.43 |
| Tertiary dodecyl mercaptan | 0.05 |
| Di-isopropylbenzene hydroperoxide | 0.10 |
| Sodium formaldehyde sulfoxylate | 0.12 |
| Ferrous sulfate heptahydrate | 0.007 |
| Tetra sodium salt of ethylene diamine tetraacetic acid | 0.028 |
| Sodium dithionite | 0.035 |
| Water | 130 |

The above mixture was agitated by end over end rotation at 5° C. Water was added during polymerization as shown in the following table. After 7¾ hours, the reaction was shortstopped with potassium dimethyl dithiocarbamate, and the monomers stripped. The solids were 31% representing 75.5% conversion.

| Approximate solids: | Added water (parts) |
|---|---|
| 10% | 19.7 |
| 25% | 5.6 |
| After stripping | 5.6 |

Run B, another control, was run with increment soap addition. The ingredients were as follows:

| | Parts |
|---|---|
| Butadiene 1,3 | 51 |
| Styrene | 49 |
| Potassium soap of disproportionated rosin acids | 1.5 |
| Condensation product of sodium naphthalene sulfonate and formaldehyde | 0.43 |
| Potassium sulfate | 0.43 |
| Tertiary dodecyl mercaptan | 0.05 |
| Di-isopropylbenzene hydroperoxide | 0.10 |
| Sodium formaldehyde sulfoxylate | 0.12 |
| Ferrous sulfate heptahydrate | 0.007 |
| Tetra sodium salt of ethylene diamine tetraacetic acid | 0.028 |
| Sodium dithionite | 0.035 |
| Water | 130 |

The above mixture was agitated by end over end rotation at 5° C. Water and potassium oleate were added during polymerization as shown in the following table. After 7¾ hours, the reaction was shortstopped with potassium dimethyldithiocarbamate, and the monomers stripped. The solids were 34.2%, representing 86.0% conversion.

| Approximate Solids | Added Water (parts) | Added Potassium Oleate (parts) |
|---|---|---|
| 10% | 19.7 | 4.0 |
| 25% | 5.6 | 1.0 |
| After stripping | 5.6 | 1.0 |

Runs C, D, E and F were similar to run A except that the recipes contained 0.25, 0.625, 1.25, and 2.00 parts of polyethylated castor oil, respectively, and the conversions were different. Commercial polyethylated castor oil was used in this and the other examples.

Conversions and average particle diameters in Angstrom units (A.) of runs A to F are shown in the following table:

| Runs | A | B | C | D | E | F |
|---|---|---|---|---|---|---|
| Conversion (percent) | 76 | 86 | 74 | 63 | 84 | 85 |
| Avg. Part diam. (A.) | 490 | 500 | 710 | 875 | 1,990 | 2,220 |

For concentrating, control runs A and B were combined, runs C and D were combined, and runs E and F were combined, in order to have enough latex for the operations. Combined runs A and B, C and D, and E and F were concentrated. Combined runs A and B was concentrated to 45.3% solids at an unsatisfactory high viscosity of 7500 centipoises. All viscosities referred to herein were measured on a Brookfield viscometer. Combined runs C and D was concentrated to 58.4% solids at a viscosity of 2000 centipoises. Combined runs E and F was concentrated to 62.3% solids at a viscosity of 1420 centipoises. The latices in this and the other examples were concentrated in a laboratory disc concentrator in which the latex was heated to 50° C. to 70° C., a current of air was passed over the latex, and revolving discs cut the surface of the latex to aid in the evaporation.

The above shows the great increase in particle size on polymerizing the rubber forming monomers in the presence of polyoxyethylated castor oil, and the concentration of such large particle size latices to fluid latices of high solids content.

Example 2

In control run G, a 24-ounce glass bottle reactor was loaded with the following ingredients:

| | Parts |
|---|---|
| Butadiene-1,3 | 70 |
| Styrene | 30 |
| Potassium oleate | 2.4 |
| Potassium soap of disproportionated rosin acids | 1.0 |
| Condensation product of sodium naphthalene sulfonate and formaldehyde | 0.28 |
| Potassium sulfate | 2.0 |
| Tertiary dodecyl mercaptan | 0.03 |
| Di-isopropylbenzene hydroperoxide | 0.07 |
| Sodium formaldehyde sulfoxylate | 0.08 |
| Ferrous sulfate heptahydrate | 0.005 |
| Tetra sodium salt of ethylene diamine tetraacetic acid | 0.018 |
| Sodium dithionite | 0.03 |
| Water | 150 |

Runs H and I, according to the present invention, were similar to run G except the recipes contained 0.004 and 0.008 part of polyoxyethylated castor oil, respectively.

Polymerizations of runs G, H and I were carried out at 5° C. for 7½ hours. The conversion of run G was 60.8%, giving a latex of average particle size of 1320 Angstrom units. The conversions of runs H and I were 59.2% and 54.2% respectively, giving latices of average particle diameter of 1880 and 2130 Angstrom units, respectively.

*Example 3*

In control run J, four 24-ounce glass bottle reactors were loaded with the following ingredients:

| | Parts |
|---|---|
| Butadiene-1,3 | 70 |
| Styrene | 30 |
| Potassium oleate | 3.0 |
| Potassium soap of disproportionated rosin acids | 1.5 |
| Condensation product of sodium naphthalene sulfonate and formaldehyde | 1.5 |
| Potassium sulfate | 1.9 |
| Tertiary dodecyl mercaptan | 0.10 |
| Di-isopropylbenzene hydroperoxide | 0.15 |
| Sodium formaldehyde sulfoxylate | 0.20 |
| Ferrous sulfate heptahydrate | 0.015 |
| Tetra sodium salt of ethylene diamine tetraacetic acid | 0.03 |
| Sodium dithionite | 0.03 |
| Water | 150 |

Run K, according to the present invention, was similar to run J except three 24-ounce bottles were loaded and the recipe for each contained 0.8 part of polyoxyethylated castor oil.

Polymerizations were carried out at 5° C. to an average conversion of about 70% in run J and to an average conversion of about 65% in run K. The average particle diameter of the combined four samples of run J was 1160 Angstrom units, and the average particle diameter of the three samples of run K was 1520 Angstrom units. The combined four samples of run J was concentrated to 56.6% solids at a viscosity of 3200 centipoises and an average particle diameter of 1320 Angstrom units. The combined three samples of run K was concentrated to 65.5% solids at a viscosity of 190 centipoises and an average particle diameter of 1520 Angstrom units.

*Example 4*

Control run L had the same polymerization recipe as control run J of Example 3 except a different commercial condensation product of sodium naphthalene sulfonate and formaldehyde was used.

Run M, according to the present invention, had a polymerization recipe similar to control run L except the 1.9 parts of sodium sulfate was omitted and there was included in the recipe 0.8 part of polyoxyethylated castor oil.

Run L was polymerized at 5° C. for 7.5 hours to a conversion of 72.6%, giving a latex of average particle diameter of 1270 Angstrom units. Run M was polymerized at 5° C. for 23.3 hours to a conversion of 66.5%, giving a latex of average particle diameter of 1860 Angstrom units.

It is evident from the above that the polyoxyethylated castor oil gives a much greater increase in particle size of the latex than does the potassium sulfate.

The latices produced in Examples 1 to 4, with and without the polyoxyethylated castor oil, were substantially free from prefloc, i.e. coagulum that must be removed before the latex can be used as such.

Non-ionic surface-active agents which are reaction products of ethylene oxide and higher fatty alcohols, ethylene oxide and higher fatty acids, and ethylene oxide and alkylated phenols are well known, and have been used with various anionic surface-active agents as the emulsifiers and stabilizers in the preparation of various synthetic rubber latices. These other ethylene oxide reaction products do not give the great increase in particle size of the latices that are obtained with the reaction product of ethylene oxide and castor oil according to the present invention, and often times give excessively large amounts of prefloc. This is shown in Examples 5 and 6.

*Example 5*

Control run N had the same polymerization recipe as control run J of Example 3.

Run O, according to the present invention, had a polymerization recipe similar to control run N except it contained 0.8 part of polyoxyethylated castor oil.

Run P had a polymerization recipe similar to control run N except it contained 0.8 part of a commercial condensation product of a higher fatty alcohol with ethylene oxide (polyoxyethylated oleyl alcohol).

Run Q had a polymerization recipe similar to control run N except it contained 0.8 part of a commercial condensation product of a higher fatty acid with ethylene oxide (polyoxyethylated oleic acid).

Two samples each of runs N, O, P and Q were polymerized at 5° C. for 23.7 hours, giving average conversions of 87%, 54%, 54%, and 82% for the two samples of runs N, O, P and Q, respectively. The latices of runs N and O contained not more than 0.2% prefloc based on the solids of the latex. In run P, one sample contained about 20% prefloc and the other sample contained about 16% prefloc, based on the solids of the latex. In run Q, each sample contained about 13% prefloc, based on the solids of the latex.

The two samples of each of runs N, O, P and Q were combined and concentrated after removing the prefloc from the combined samples of each of run P and run Q.

The solids concentration, viscosity and particle size of the concentrates of runs N, O, P and Q are shown in the following table:

| Runs | N | O | P | Q |
|---|---|---|---|---|
| Solids concentration (percent) | 54.8 | 70.0 | 64.2 | 56.5 |
| Viscosity (centipoises) | 1,360 | 840 | 5,300 | 4,500 |
| Average Particle diam. (A.) | 1,350 | 1,810 | 1,460 | 1,180 |

*Example 6*

Control run R had the same polymerization recipe as control run J of Example 3.

Runs S and T, according to the present invention, had polymerization recipes similar to control run N except the recipes contained 0.5 part and 1.0 part of polyoxyethylated castor oil for runs S and T, respectively.

Runs U and V had polymerization recipes similar to control run N except the recipes contained 0.5 part and 1.0 part of a commercial condensation product of an alkyl phenol with ethylene oxide (polyoxyethylated alkyl phenol), respectively.

Polymerization of runs R, S, T, U and V were carried out at 5° C. to latices of 25% to 35% solids content and measurement of the average particle sizes were made.

Run R had a solids content of 33.6% and an average particle diameter of 1300 Angstrom units.

Runs S and T had solids content of 27.1% and 26.6%, respectively, and average particle diameters of 1870 and 2080 Angstom units, respectively.

Runs U and V had solids content of 33.0% and 32.8%, respectively, and average particle diameters of 1370 and 2080 Angstrom units, respectively.

It is evident from Examples 5 and 6 that polyoxyethylated higher fatty alcohols and polyoxyethylated higher fatty acids and polyoxyethylated alkyl phenols do not give the improvements of the polyoxyethylated castor oil of the present invention.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. In the method of making a synthetic rubber latex by subjecting to polymerizing conditions an aqueous emulsion of polymerizable synthetic rubber forming monomers containing 3 to 10 parts of anionic surface-active dispersing agent per 100 parts of polymerizable monomers, the improvement which comprises carrying out the polymerization in the presence of polyoxyethylated castor oil, the amount of said polyoxyethylated castor oil being from 0.004 to 2 parts per 100 parts of the original rubber forming monomers, said synthetic rubber forming monomers being selected from the group consisting of butadiene-1,3, isoprene, 2,3-dimethylbutadiene-1,3, piperylene, mixtures of such butadienes-1,3 with one another, and mixtures of such butadienes-1,3 with monoethylenic compounds which contain a $CH_2\!=\!C\!<$ group and are copolymerizable with butadienes-1,3, said monoethylenic compounds being up to 70% by weight of such mixtures, said anionic surface-active agent comprising 0.2 to 1 part selected from the group consisting of sulfonated and sulfated surface-active agents and the remainder of the 3 to 10 parts being selected from the group consisting of water-soluble soaps of higher fatty acids and water-soluble soaps of rosin acids.

2. In the method of making a synthetic rubber latex by subjecting to polymerizing conditions an aqueous emulsion of polymerizable synthetic rubber forming monomers containing 3 to 10 parts of anionic surface-active dispersing agent per 100 parts of polymerizable monomers, the improvement which comprises carrying out the polymerization in the presence of polyoxyethylated castor oil, the amount of said polyoxyethylated castor oil being from 0.05 to 2 parts per 100 parts of the original rubber forming monomers, said synthetic rubber forming monomers being selected from the group consisting of butadiene-1,3, isoprene, 2,3-dimethylbutadiene-1,3, piperylene, mixtures of such butadienes-1,3 with one another, and mixtures of such butadienes-1,3 with monoethylenic compounds which contain a $CH_2\!=\!C\!<$ group and are copolymerizable with butadienes-1,3, said monoethylenic compounds being up to 70% by weight of such mixtures, said anionic surface-active agent comprising 0.2 to 1 part selected from the group consisting of sulfonated and sulfated surface-active agents and the remainder of the 3 to 10 parts being selected from the group consisting of water-soluble soaps of higher fatty acids and water-soluble soaps of rosin acids.

3. In the method of making a synthetic rubber latex by subjecting to polymerizing conditions an aqueous emulsion of butadiene-1,3 and styrene containing 3 to 10 parts of anionic surface-active dispersing agent per 100 parts of polymerizable monomers, the improvement which comprises carrying out the polymerization in the presence of 0.004 to 2 parts of polyoxyethlated castor oil per 100 parts of said butadiene-1,3 and styrene, said anionic surface-active agent comprising 0.2 to 1 part selected from the group consisting of sulfonated and sulfated surface-active agents and the remainder of the 3 to 10 parts being selected from the group consisting of water-soluble soaps of higher fatty acids and water-soluble soaps of rosin acids.

4. In the method of making a synthetic rubber latex by subjecting to polymerizing conditions an aqueous emulsion of butadiene-1,3 and styrene containing 3 to 10 parts of anionic surface-active dispersing agent per 100 parts of polymerizable monomers, the improvement which comprises carrying out the polymerization in the presence of 0.05 to 2 parts of polyoxyethylated castor oil per 100 parts of said butadiene-1,3 and styrene, said anionic surface-active agent comprising 0.2 to 1 part selected from the group consisting of sulfonated and sulfated surface-active agents and the remainder of the 3 to 10 parts being selected from the group consisting of water-soluble soaps of higher fatty acids and water-soluble soaps of rosin acids.

References Cited by the Examiner

UNITED STATES PATENTS

| | | | |
|---|---|---|---|
| 2,300,056 | 10/1942 | Meis et al. | 260—23.7 |
| 2,605,242 | 7/1952 | Betts et al. | 260—23.7 |

OTHER REFERENCES

Speel: "Textile Chemicals and Auxiliaries," 1952, pp. 324–327.

Whitby: "Synthetic Rubber," 1954, pp. 658 and 659.

Helin et al.: Ind. Eng. Chem., 45 (No. 6), 1330–36 (1953).

LEON J. BERCOVITZ, *Primary Examiner.*

ALPHONSO D. SULLIVAN, *Examiner.*

T. D. KERWIN, R. A. WHITE, *Assistant Examiners.*